US008621051B2

(12) United States Patent
Agarwala et al.

(10) Patent No.: US 8,621,051 B2
(45) Date of Patent: *Dec. 31, 2013

(54) END-TO END PROVISIONING OF STORAGE CLOUDS

(71) Applicant: International Business Machines Corporation, Armonk, NY (US)

(72) Inventors: Sandip Agarwala, Cupertino, CA (US); Richard J. Ayala, Medford, NJ (US); Kavita Chavda, Roswell, GA (US); Sandeep Gopisetty, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,631

(22) Filed: Mar. 25, 2013

(65) Prior Publication Data

US 2013/0219033 A1    Aug. 22, 2013

Related U.S. Application Data

(63) Continuation of application No. 12/857,005, filed on Aug. 16, 2010, now Pat. No. 8,478,845.

(51) Int. Cl.
*G06F 15/177* (2006.01)
*G06F 15/173* (2006.01)

(52) U.S. Cl.
USPC .................................... 709/220; 9/224; 9/226

(58) Field of Classification Search
USPC ........................................................ 709/220
See application file for complete search history.

(56) References Cited

U.S. PATENT DOCUMENTS

| 6,880,002 | B2 | 4/2005 | Hirschfeld et al. | |
|---|---|---|---|---|
| 7,568,052 | B1* | 7/2009 | Cwiakala et al. | 710/8 |
| 7,574,496 | B2 | 8/2009 | McCrory et al. | |
| 2003/0086117 | A1* | 5/2003 | Lester et al. | 358/1.15 |
| 2004/0024979 | A1* | 2/2004 | Kaminsky et al. | 711/162 |
| 2004/0107273 | A1* | 6/2004 | Biran et al. | 709/223 |
| 2005/0223014 | A1* | 10/2005 | Sharma et al. | 707/10 |
| 2006/0074940 | A1* | 4/2006 | Craft et al. | 707/100 |
| 2007/0011136 | A1* | 1/2007 | Haskin et al. | 707/1 |
| 2008/0120435 | A1* | 5/2008 | Moreira et al. | 710/1 |
| 2008/0155315 | A1* | 6/2008 | Gunda et al. | 714/8 |

(Continued)

OTHER PUBLICATIONS

Mell et al., "The NIST Definition of Cloud Computing", National Institute of Standards and Technology, Information Technology Laboratory, Version 15, Oct. 7, 2009, 2 pages.

(Continued)

*Primary Examiner* — Richard G Keehn
(74) *Attorney, Agent, or Firm* — William E. Schiesser; Keohane & D'Alessandro, PLLC

(57) ABSTRACT

Embodiments discussed in this disclosure provide an integrated provisioning framework that automates the process of provisioning storage resources, end-to-end, for an enterprise storage cloud environment. Such embodiments configure and orchestrate the deployment of a user's workload and, at the same time, provide optimization across a multitude of storage cloud resources. Along these lines, input is received in the form of workload requirements and configuration information for available system resources. Based on the input, a set (at least one) of storage cloud configuration plans is developed that satisfy the workload requirements. A set of scripts is then generated that orchestrate the deployment and configuration of different software and hardware components based on the plans.

17 Claims, 6 Drawing Sheets

(56) References Cited

U.S. PATENT DOCUMENTS

| | | |
|---|---|---|
| 2008/0184225 A1 | 7/2008 | Fitzgerald et al. |
| 2009/0037925 A1* | 2/2009 | Jacobs et al. ............... 718/105 |
| 2009/0077414 A1* | 3/2009 | Benhase et al. ................ 714/4 |
| 2009/0157998 A1 | 6/2009 | Batterywala |
| 2009/0177756 A1* | 7/2009 | Gunda et al. ................ 709/216 |
| 2009/0300210 A1 | 12/2009 | Ferris |
| 2010/0042720 A1 | 2/2010 | Stienhans et al. |
| 2010/0049798 A1* | 2/2010 | McCabe et al. .............. 709/203 |
| 2010/0050172 A1 | 2/2010 | Ferris |
| 2010/0125473 A1 | 5/2010 | Tung et al. |
| 2010/0153482 A1 | 6/2010 | Kim et al. |
| 2010/0161759 A1 | 6/2010 | Brand |
| 2010/0169673 A1* | 7/2010 | Saripalli ...................... 713/300 |
| 2010/0198972 A1 | 8/2010 | Umbehocker |
| 2010/0333116 A1* | 12/2010 | Prahlad et al. ............... 719/328 |
| 2011/0055377 A1 | 3/2011 | Dehaan |
| 2011/0125895 A1* | 5/2011 | Anderson et al. ............ 709/224 |
| 2011/0131193 A1* | 6/2011 | Pasupuleti et al. ............ 707/704 |
| 2011/0161281 A1* | 6/2011 | Sayyaparaju et al. ......... 707/607 |
| 2011/0296022 A1* | 12/2011 | Ferris et al. .................. 709/226 |

OTHER PUBLICATIONS

Shieh, A., "Seawall: Performance Isolation for Cloud Datacenter Networks", presented Jun. 22, 2010 at the "2nd USENIX Workshop on Hot Topics in Cloud Computing" in Boston, MA, http://research.microsoft.com/en-us/UM/people/srikanth/data/hotcloud10_seawall.pdf.

Richard G. Keehn, USPTO Office Action, U.S. Appl. No. 12/857,005, Mail Date Jan. 17, 2012, 22 pages.

Richard G. Keehn, USPTO Final Office Action, U.S. Appl. No. 12/857,005, Mail Date Jun. 20, 2012, 19 pages.

Richard G. Keehn, USPTO Office Action, U.S. Appl. No. 12/857,005, Mail Date Sep. 4, 2012, 21 pages.

Richard G. Keehn, USPTO Notice of Allowance and Fees(s) Due, U.S. Appl. No. 12/857,005, Date Mailed Dec. 21, 2012, 16 pages.

* cited by examiner

END-TO END PROVISIONING OF STORAGE CLOUDS

RELATED U.S. APPLICATION DATA

The present patent document is a continuation of U.S. patent application Ser. No. 12/857,005, filed Aug. 16, 2010, entitled "END-TO-END PROVISIONING OF STORAGE CLOUDS". The disclosure of U.S. patent application Ser. No. 12/857,005 is incorporated herein by reference.

TECHNICAL FIELD

The present invention relates generally to storage provisioning. Specifically, the present invention relates to end-to-end provisioning of storage clouds.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices.

Enterprise storage clouds are comprised of multiple layers of software and hardware components, all of which need to be correctly configured for proper functioning of the storage cloud service. For example, a Network Attached Storage (NAS)-based storage cloud is typically comprised of storage subsystems, inter-connection fabric (fiber channel, Infini-Band, Ethernet, etc.), storage nodes, interface nodes, file system, etc. System administrators have to rely on a litany of management tools to manage and configure these components individually and provision storage resources for end-users. Such independent management may be costly, error-prone and time-consuming and may either result in under-provisioning or suboptimal utilization of resources.

SUMMARY

Embodiments discussed in this disclosure provide an integrated provisioning framework that automates the process of provisioning storage resources, end-to-end, for an enterprise storage cloud environment. Such embodiments configure and orchestrate the deployment of a user's workload and, at the same time, provide optimization across a multitude of storage cloud resources. Along these lines, input is received in the form of workload requirements and configuration information for available system resources. Based on the input, a set (at least one) of storage cloud configuration plans is developed that satisfy the workload requirements. A set of scripts is then generated that orchestrate the deployment and configuration of different software and hardware components based on the plans.

A first aspect of the present invention provides a method for end-to-end provisioning of storage clouds, comprising: accessing a set of workload requirements and a set of system resource configurations for a set of hardware and software components associated with a storage cloud; generating a set of plans for provisioning the storage cloud, each of the set of plans proposing an adjustment of the set of system resource configurations so that the set of workload requirements are met; and generating a set of scripts to carry out the set of plans, the set of scripts being configured to orchestrate a deployment and a configuration of the set of hardware and software components.

A second aspect of the present invention provides a system for end-to-end provisioning of storage clouds, comprising: a bus; a processor coupled to the bus; and a memory medium coupled to the bus, the memory medium comprising instructions to: access a set of workload requirements and a set of system resource configurations for a storage cloud; access a set of workload requirements and a set of system resource configurations for a set of hardware and software components associated with a storage cloud; generate a set of plans for provisioning the storage cloud, each of the set of plans proposing an adjustment of the set of system resource configurations so that the set of workload requirements are met; and generate a set of scripts to carry out the set of plans, the set of scripts being configured to orchestrate a deployment and a configuration of the set of hardware and software components.

A third aspect of the present invention provides a computer program product for end-to-end provisioning of storage clouds, the computer program product comprising a computer readable storage media, and program instructions stored on the computer readable storage media, to: access a set of workload requirements and a set of system resource configurations for a set of hardware and software components associated with a storage cloud; generate a set of plans for provisioning the storage cloud, each of the set of plans proposing an adjustment of the set of system resource configurations so that the set of workload requirements are met; and generate a set of scripts to carry out the set of plans, the set of scripts being configured to orchestrate a deployment and a configuration of the set of hardware and software components.

A fourth aspect of the present invention provides a method for deploying a system for end-to-end provisioning of storage clouds, comprising: providing a computer infrastructure being operable to: access a set of workload requirements and a set of system resource configurations for a set of hardware and software components associated with a storage cloud; generate a set of plans for provisioning the storage cloud, each of the set of plans proposing an adjustment of the set of system resource configurations so that the set of workload requirements are met; and generate a set of scripts to carry out the set of plans, the set of scripts being configured to orchestrate a deployment and a configuration of the set of hardware and software components.

BRIEF DESCRIPTION OF THE DRAWINGS

These and other features of this invention will be more readily understood from the following detailed description of the various aspects of the invention taken in conjunction with the accompanying drawings in which.

Figure 1:
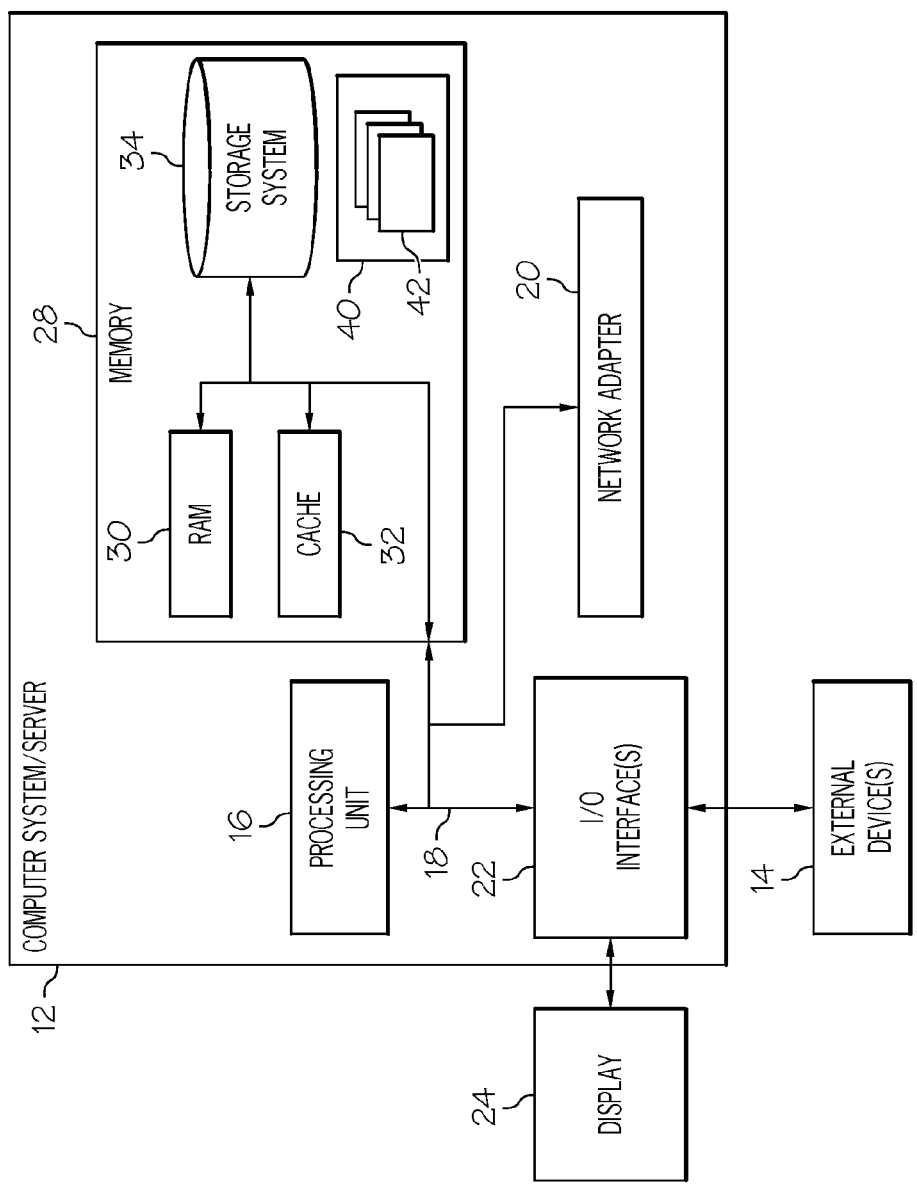
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments discussed in this disclosure provide an integrated provisioning framework that automates the process of provisioning storage resources, end-to-end, for an enterprise storage cloud environment. Such embodiments configure and orchestrate the deployment of a user's workload and, at the same time, provide optimization across a multitude of storage cloud resources. Along these lines, input is received in the form of workload requirements and configuration information for available system resources. Based on the input, a set (at least one) of storage cloud configuration plans is developed that satisfy the workload requirements. A set of scripts is then generated that orchestrate the deployment and configuration of different software and hardware components based on the plans.

In this disclosure, it is assumed that the storage cloud is based on General Parallel File Systems (GPFS), which provides a scalable and parallel access to backend storage consisting of a Storage Area Network (SAN). However, this need not be the case as similar techniques can also be applied to other cloud architectures as well. Moreover, it is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
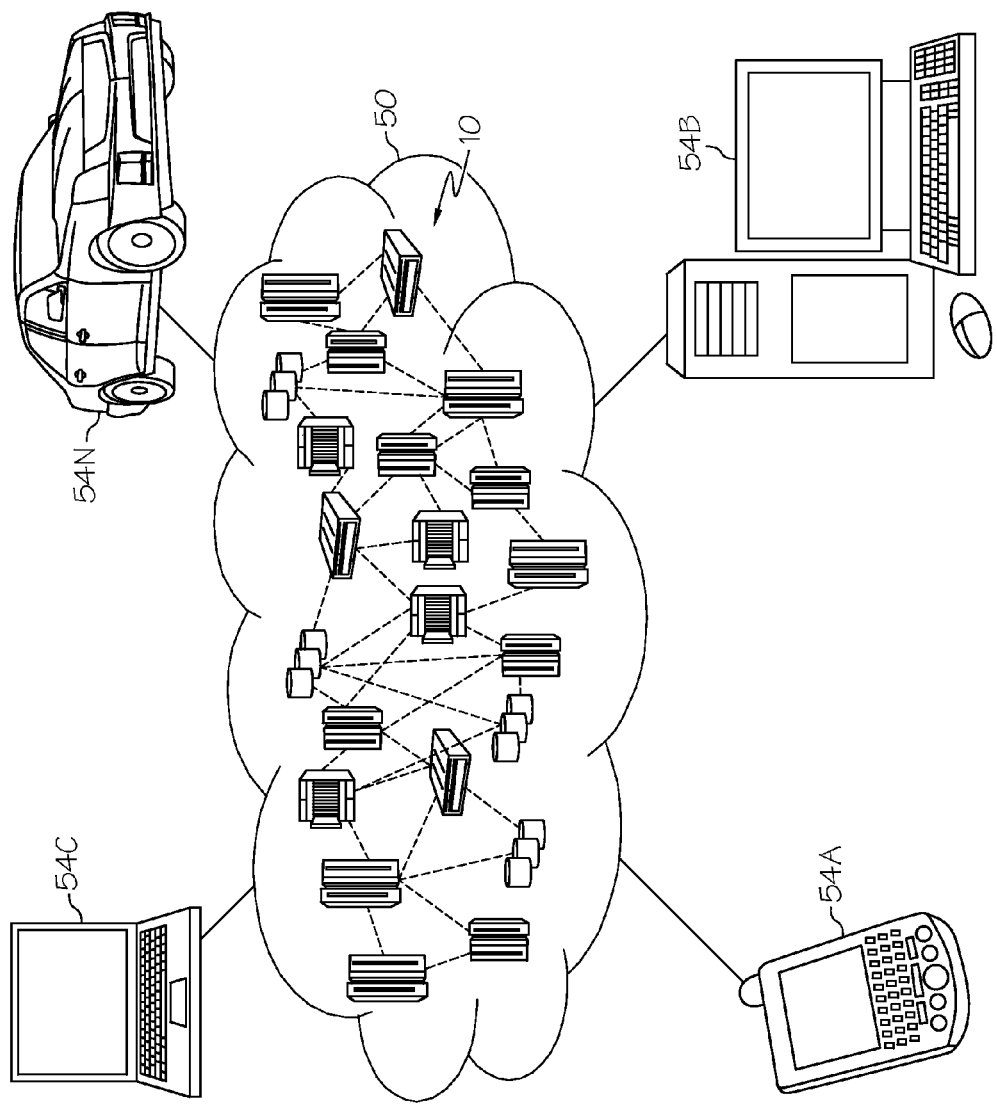
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
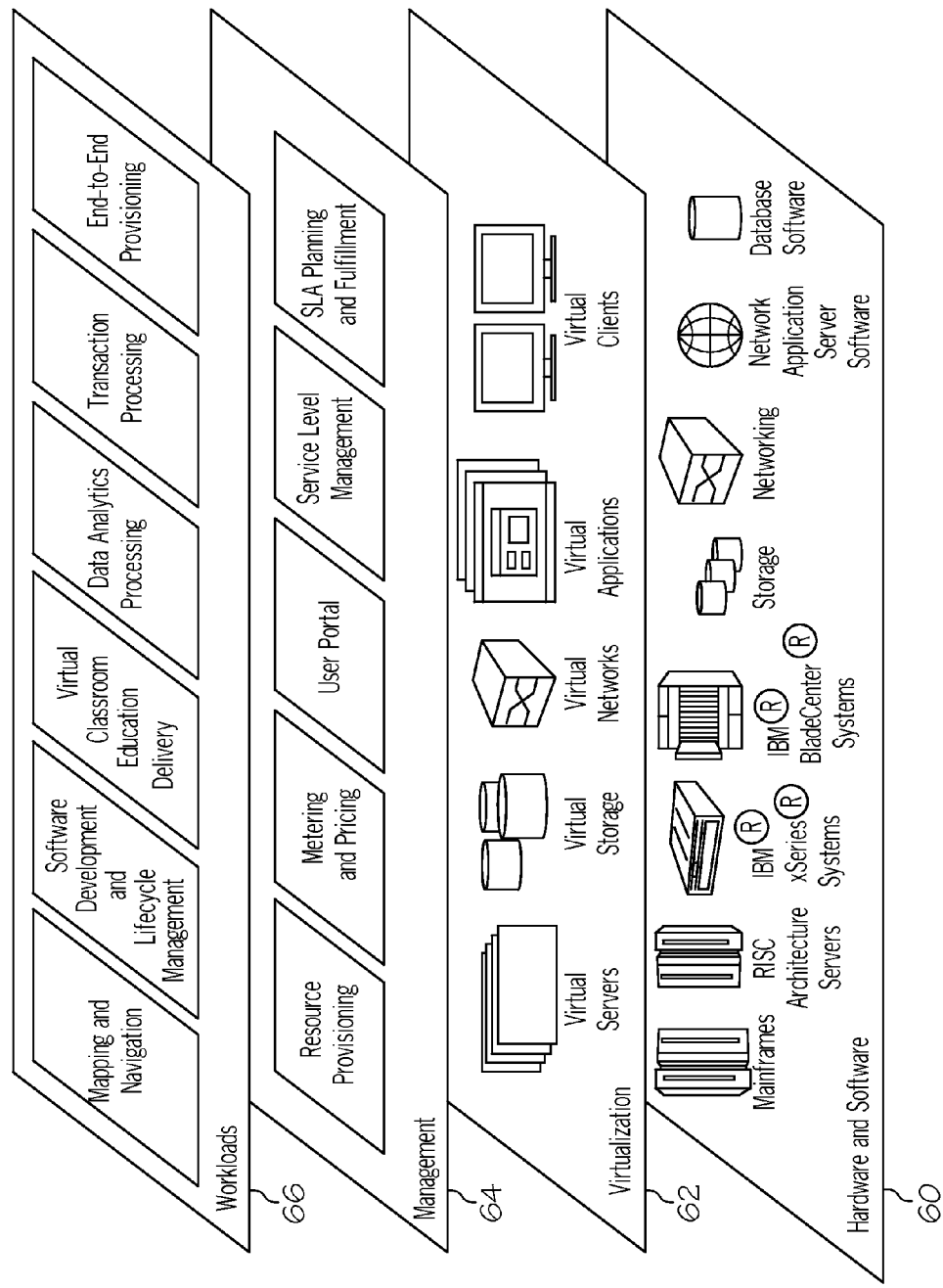
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and end-to end provisioning. As mentioned above, all of the foregoing examples described with respect to FIG. 3 are illustrative only, and the invention is not limited to these examples.

It is understood all functions of the present invention as described herein are typically performed by the end-to-end provisioning function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed. Moreover, although the illustrative embodiment of FIGS. 4-6 discusses a GPFS-based cloud storage configuration, this need not be the case. Rather, the teachings recited herein could be applied to any type of storage configuration.

Figure 4:
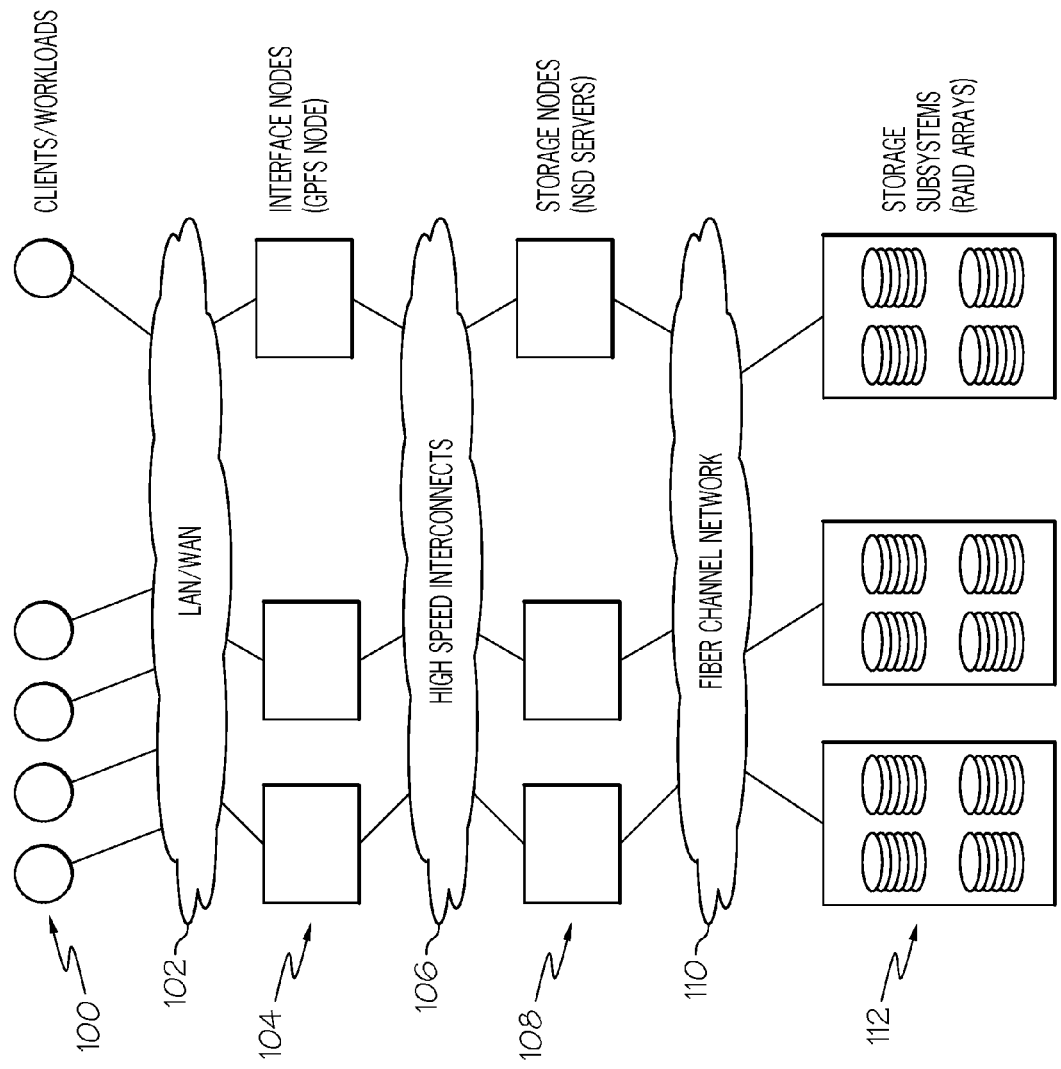
FIG. 4 depicts an architectural diagram according to an embodiment of the present invention.

Referring now to FIG. 4, an illustrative architecture according to an embodiment of the present invention is shown. As shown, a set (at least one) of clients 100 can communicate with a set of interface nodes 104 (e.g., GPFS nodes) over a network connection 102 (e.g., LAN, WAN, etc.). Set of interface nodes 104 then communicate via interconnects 106 (e.g., high sped interconnects) with a set of storage nodes 108. As further shown, set of storage nodes 108 then interface with a set of storage subsystems 112 (e.g., Redundant Array of Independent Disks (RAID)) via fiber channel network 110. As discussed above, the embodiments of the present invention provide end-to-end provisioning for storage architectures such as that shown in FIG. 4. Among other things, such embodiments will discover resources present in a given architecture, take into account workload requirements and configurations, develop a set of plans for provisioning the architecture based on the workload requirements and configurations, and develop scripts for executing the set of plans.

Figure 5:
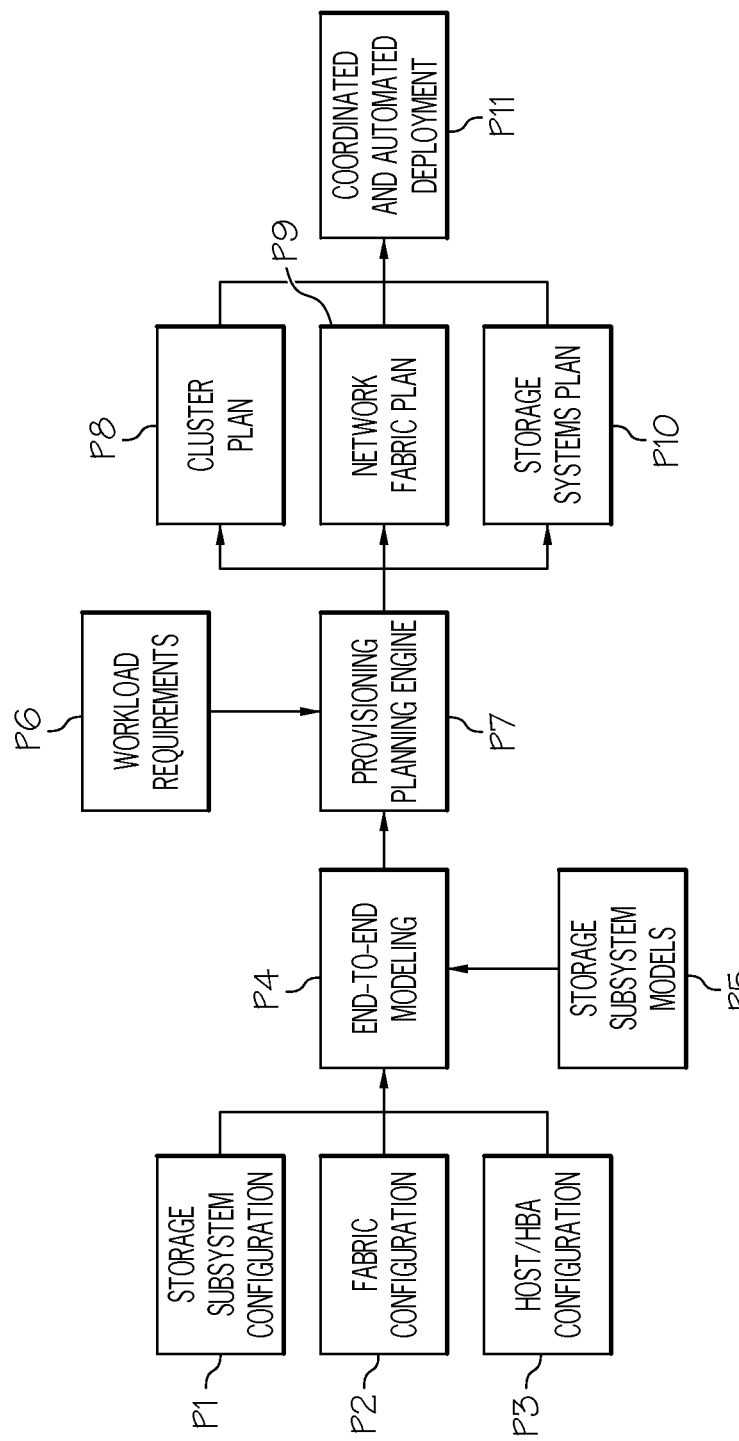
FIG. 5 depicts a process flow diagram according to an embodiment of the present invention.

Referring now to FIG. 5, a process flow diagram according to an embodiment of the present invention is shown. Specifically, FIG. 5 depicts various components and/or elements that perform the functions of the embodiments of the present invention. Among other things, one task performed by provisioning engine P7 is to determine/provide storage configuration(s) (e.g., a GPFS configuration) that can accommodate: (1) the space, performance and other requirements of the specified workloads (e.g., workload requirements P6); (2) different resource configurations such as storage subsystem configuration P1, fabric configuration P2, and host/HBA configuration P3; and models such as subsystem models P5.

The first step in the automated planning comprises discovery of all available resources (like storage subsystems, interconnection fabric, servers, etc.) and their configurations P1-P3. The performance and resiliency of the storage cloud may be dependent on the composition and configuration of different logical and physical entities like storage arrays, Logical Unit Numbers (LUNs), zoning, I/O servers, etc. As further shown, configurations P1-P3 and models P5 can be received by end-to-end modeling system P4, which will generate a set of models that is utilized by provisioning planning engine P7 along with workload requirements P6 to generate a set of plans such as (GPFS) cluster plan P8, network fabric plan P9, storage subsystem plan P10. In a typical embodiment, workload requirements P6 can be specified as follows:

Capacity Requirements: Space, quota.

Performance Requirements: Input/Output per Second (IOPS), read/write ratio, random/sequential ratio, cache hit ratio, etc.

Workload types: Online Transaction Processing (OLTP), Scientific, Warehouse, backup, etc.

In one embodiment, the plan(s) P8-10 can call for either extending an existing GPFS cluster (by adding new storage nodes and/or LUNs, or by creating a completely new GPFS cluster. As indicated above, automated planning hereunder includes discovery of all available resources (e.g., storage subsystems, interconnection fabric, servers, etc.) and their configurations. The provisioning planning engine P7 determines the number and configuration of these entities based on their availabilities and capabilities, the workload requirements and industry best practices.

It is understood that the indentations and subsection indicators shown below are for clarity and ease of reading only, and are not intended to limit any of the teachings recited herein. At the end of the planning process, the provisioning planning engine P7 produces a list of configuration plans that comprises:

i) The number, size and type of LUNs shown in the formula below. The LUNs are placed such that their loads are spread across multiple storage arrays, pools, device adapters, etc. The type of the arrays and the RAID levels are selected such that the set of LUNs can cumulatively handle the workload performance requirements. Since GPFS places data across all available disks, the provisioning planning engine P7 tries to maintain uniformity in the size and type of LUNs within a GPFS cluster. This ensures uniform distribution of load.

$$\sum_{i}^{Set\ of\ workloads} C_i \le \sum_{j}^{Set\ of\ LUNs} L_j$$

ii) The provisioning planning engine P7 determines the number and types of GPFS nodes as shown in the formulation below. Depending on the workload requirements, the provisioning planning engine P7 configures these nodes as interface nodes, network shared disk (NSD) servers, quorum node, or manager node. Clients connect to interface nodes and these types of nodes access the shared disk via NSD servers. There are various types of manager nodes: cluster, file system and token.

Let N=Number of NSD servers
Let $S_i$=I/O capacity of each NSD server
Let M=Number of Workloads
Let $W_i$=Average I/O requirement of workload 'i'

$$\sum_{i}^{N} S_i \ge \sum_{i}^{M} W_i$$

The above formulation calculates the minimum number of NSD servers required for a given set of workloads. In order to introduce certain levels of fault tolerance, system administrators may want to introduce some redundancy at the NSD server level. Let the redundancy factor be 'r'. The final number of NSD server deployed is [r.M]

The number/configuration of interface nodes can also be calculated in a similar fashion. In this case, the I/O capacity of an interface node is the maximum I/O traffic that can be supported between the clients and the interface nodes.

iii) Thereafter, LUNs are masked/mapped to the NSD servers. Depending on the fabric connectivity and resiliency requirements, LUNs can be mapped to all or a subset of NSD servers. The provisioning planning engine P7 determines complete a end-to-end data path from HBA (Host Bus Adapter) ports in the NSD servers to storage subsystem FC (fiber channel) ports.

GPFS permits a maximum of 8 NSD servers per LUN. In most cases, it is not necessary to have that many mappings. But for load balancing and fault tolerance reasons, the provisioning planning engine P7 configures two or more paths between the LUNs and the NSD servers. The exact fiber channel ports involved in the mapping are determined based on existing load on the ports and corresponding fabric and fiber channel switches. To provide redundancy (e.g., in the event NSD server failure), the provisioning planning engine P7 maps each LUN to at least 2 NSD servers.

In addition to plans P8-P10, output provided by provisioning planning engine P7 could comprise: (1) a proposed storage architecture configuration: storage volumes, LUN mapping/masking, multipath configuration, zoning configuration, etc; (2) a proposed GPFS cluster configuration: network shared disk (NSD), NSD servers, Interface node, GPFS manager nodes, etc.; and/or (3) a proposed GPFS configuration: file systems, GPFS storage pools, etc.

Based on user or system selection, the provisioning planning engine P7 generates a set of deployment scripts to automate the installation of drivers and tools, creation of new entities and configuration of existing ones (collectively shown as coordinated and automated deployment P11. This simplifies the cloud provisioning process, reduces cost and the possibility of making errors. In a typical embodiment, the scripts are generated by provisioning planning engine while the plans are being generated or shortly thereafter. Specifically, as courses of actions (e.g., configuration changes) for the plans are determined, correlating commands will be generated for carrying out the changes. Along these lines, commands/scripts can be generated for any element denoted in a plan. In providing this functionality, appropriate commands for carrying out plan elements can be determined based upon a lookup table (e.g., that associates actions/changes with commands and or API calls), a rules engine, etc.

The process of generating and executing scripts can also be referred to as deployment management that generally comprises: invoking appropriate Application Programming Interfaces (APIs); and utilizing command line tools to deploy the plans. For the teachings herein, this would mean invoking web service APIs in Storage Resource Management (SRM) tools such as Tivoli® Storage Productivity Center (TPC), which provides different APIs. Among other things, Tivoli can be used to create new LUNs, configure LUN mapping/masking, fiber channel zoning, etc. Tivoli and related terms are trademarks of IBM Corp. in the United States and/or other countries. For cluster creation and other GPFS configuration management tasks, GPFS command line tools can be utilized. Shown below are some examples:

% mmcrcluster—N node1,node2%
% mmcrnsd—F diskDesriptorFile; where diskDesriptorFile contains information about the two LUNS created by TPC
% mmcrfs fs1 nsd1,nsd2

Figure 6:
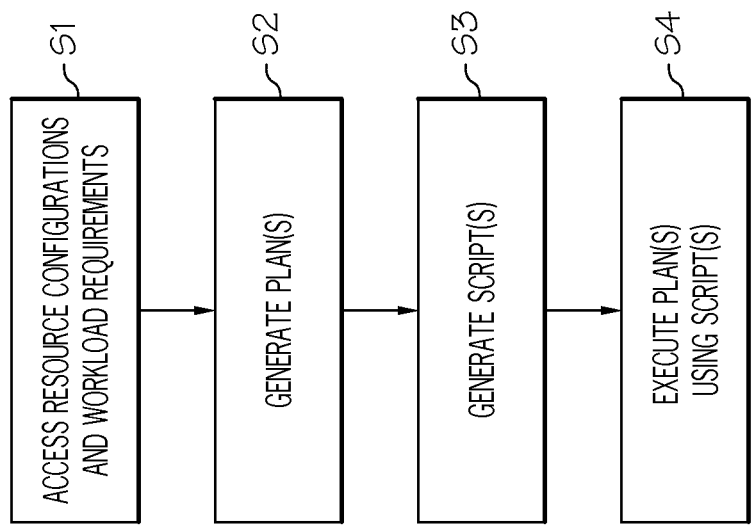
FIG. 6 depicts a method flow diagram according to an embodiment of the present invention.

Referring now to FIG. 6, a method flow diagram according to an embodiment of the present invention is shown. As depicted, in step S1, a set of workload requirements and a set of system resource configurations for a storage cloud are accessed. This typically involves discovering available resources associated with the storage cloud. Specifically, the resource discovery can include determining a number and a configuration of each of the available resources. In step S2, a set of plans for provisioning the storage cloud is generated. In general, each of the set of plans provide an adjustment of the set of system resource configurations so that the set of workload requirements are met. For example, the set of plans can: describe a configuration of a General Parallel File System (GPFS) cluster associated with the storage cloud; provide a mapping of LUNs to network shared disk (NSD) nodes; identify a number and a type of GPFS nodes associated with the storage cloud; and/or identify a number, a size, and a type of logical unit numbers (LUNs) associated with the storage cloud. Output provided based on generation of the plans can comprise, for example, a storage area network (SAN) configuration, a GPFS cluster configuration, and/or a GPFS configuration. Regardless, in step S3, a set of scripts is generated to carry out the set of plans. Along these lines, the set of scripts is configured to orchestrate a deployment and a configuration of a set of hardware and software components associated with the storage cloud. In step S4, the plans are executed using the scripts.

While shown and described herein as a storage cloud provisioning solution, it is understood that the invention further provides various alternative embodiments. For example, in one embodiment, the invention provides a computer-readable/useable medium that includes computer program code to enable a computer infrastructure to provide storage cloud provisioning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide storage cloud provisioning functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for storage cloud provisioning. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for end-to-end provisioning of storage clouds, comprising:
   accessing a set of workload requirements and a set of system resource configurations for a set of hardware and software components associated with a storage cloud;
   generating a set of plans describing a configuration of a General Parallel File System (GPFS) cluster associated with the storage cloud for provisioning the storage cloud to meet the set of workload requirements, the set of plans providing a mapping of logical unit numbers (LUNs) to network shared disk (NSD) nodes, and the set of plans proposing an adjustment based on at least one formulaic calculation, the formulaic calculation comprising:

$$\sum_{i}^{N} Si \geq \sum_{i}^{M} Wi$$

generating a set of scripts to carry out the set of plans, the set of scripts being configured to orchestrate a deployment and a configuration of the set of hardware and software components;
   deploying a set of network shared disk (NSD) servers, wherein the number of NSD servers in the set of NSD servers equals a product of r and M;
   wherein "N" is a number of NSD servers, "Si" is an input/output (I/O) capacity of each NSD server, "M" is a number of workloads, "Wi" is an average I/O requirement of a workload "i", and "r" is a redundancy factor.

2. The method of claim 1, further comprising discovering available resources associated with the storage cloud.

3. The method of claim 2, the discovering comprising determining a number and a configuration of each of the available resources.

4. The method of claim 1, the set of configuration plans identifying a number, a size, and a type of logical unit numbers (LUNs) associated with the storage cloud.

5. The method of claim 1, the set of configuration plans identifying a number and a type of GPFS nodes associated with the storage cloud.

6. The method of claim 1, further comprising generating output based on the set of plans, the output comprising a storage area network (SAN) configuration, a GPFS cluster configuration, and a GPFS configuration.

7. A system for end-to-end provisioning of storage clouds, comprising:
   a bus;
   a processor coupled to the bus; and
   a memory medium coupled to the bus, the memory medium comprising instructions to:
   access a set of workload requirements and a set of system resource configurations for a set of hardware and software components associated with a storage cloud;
   generate a set of plans describing a configuration of a General Parallel File System (GPFS) cluster associated with the storage cloud for provisioning the storage cloud to meet the set of workload requirements, the set of plans providing a mapping of logical unit numbers (LUNs) to network shared disk (NSD) nodes, and the set of plans proposing an adjustment based on at least one formulaic calculation, the formulaic calculation comprising:

$$\sum_{i}^{N} Si \geq \sum_{i}^{M} Wi$$

generate a set of scripts to carry out the set of plans, the set of scripts being configured to orchestrate a deployment and a configuration of the set of hardware and software components;
   deploy a set of network shared disk (NSD) servers, wherein the number of NSD servers in the set of NSD servers equals a product of r and M;
   wherein "N" is a number of NSD servers, "Si" is an input/output (I/O) capacity of each NSD server, "M" is a number of workloads, "Wi" is an average I/O requirement of a workload "i", and "r" is a redundancy factor.

8. The system of claim 7, the memory medium further comprising instructions to discover available resources associated with the storage cloud.

9. The system of claim 8, the memory medium further comprising instructions to determine a number and a configuration of each of the available resources.

10. The system of claim 7, the set of configuration plans identifying:
    a number, a size, and a type of logical unit numbers (LUNs) associated with the storage cloud; and
    a number and a type of GPFS nodes associated with the storage cloud.

11. The system of claim 7, the memory medium further comprising instructions to generate output based on the set of plans, the output comprising a storage area network (SAN) configuration, a GPFS cluster configuration, and a GPFS configuration.

12. A computer program product for end-to-end provisioning of storage clouds, the computer program product comprising a non-transitory computer readable storage media, and program instructions stored on the computer readable storage media, to:
    access a set of workload requirements and a set of system resource configurations for a set of hardware and software components associated with a storage cloud;
    generate a set of plans describing a configuration of a General Parallel File System (GPFS) cluster associated with the storage cloud for provisioning the storage cloud to meet the set of workload requirements, the set of plans providing a mapping of logical unit numbers (LUNs) to network shared disk (NSD) nodes, and the set of plans proposing an adjustment based on at least one formulaic calculation, the formulaic calculation comprising:

$$\sum_{i}^{N} Si \geq \sum_{i}^{M} Wi$$

generate a set of scripts to carry out the set of plans, the set of scripts being configured to orchestrate a deployment and a configuration of the set of hardware and software components;
    deploy a set of network shared disk (NSD) servers, wherein the number of NSD servers in the set of NSD servers equals a product of r and M;
    wherein "N" is a number of NSD servers, "Si" is an input/output (I/O) capacity of each NSD server, "M" is a number of workloads, "Wi" is an average I/O requirement of a workload "i", and "r" is a redundancy factor.

13. The computer program product of claim 12, further comprising program instructions stored on the computer readable storage media to discover available resources associated with the storage cloud.

14. The computer program product of claim 13, further comprising program instructions stored on the computer readable storage media to determine a number and a configuration of each of the available resources.

15. The computer program product of claim 12, the set of configuration plans identifying:
    a number, a size, and a type of logical unit numbers (LUNs) associated with the storage cloud; and
    a number and a type of GPFS nodes associated with the storage cloud.

16. The computer program product of claim 12, further comprising program instructions stored on the computer readable storage media to generate output based on the set of plans, the output comprising a storage area network (SAN) configuration, a GPFS cluster configuration, and a GPFS configuration.

17. A method for deploying a system for end-to-end provisioning of storage clouds, comprising:
    providing a computer infrastructure being operable to:
    access a set of workload requirements and a set of system resource configurations for a set of hardware and software components associated with a storage cloud;
    generating a set of plans describing a configuration of a General Parallel File System (GPFS) cluster associated with the storage cloud for provisioning the storage cloud to meet the set of workload requirements, the set of plans providing a mapping of logical unit numbers (LUNs) to network shared disk (NSD) nodes, and the set of plans proposing an adjustment based on at least one formulaic calculation, the formulaic calculation comprising:

$$\sum_{i}^{N} Si \geq \sum_{i}^{M} Wi$$

generate a set of scripts to carry out the set of plans, the set of scripts being configured to orchestrate a deployment and a configuration of the set of hardware and software components;

deploy a set of network shared disk (NSD) servers, wherein the number of NSD servers in the set of NSD servers equals a product of r and M;

wherein "N" is a number of NSD servers, "Si" is an input/output (I/O) capacity of each NSD server, "M" is a number of workloads, "Wi" is an average I/O requirement of a workload "i", and "r" is a redundancy factor.

* * * * *